United States Patent [19]

Phillippe

[11] Patent Number: 5,096,317

[45] Date of Patent: Mar. 17, 1992

[54] COMPUTER KEY COVER APPARATUS

[76] Inventor: Kerin L. Phillippe, 1902 W. 16th St., Marion, Ind. 46953

[21] Appl. No.: 667,867

[22] Filed: Mar. 12, 1991

[51] Int. Cl.$^5$ .............................................. B41J 11/62
[52] U.S. Cl. ..................................... 400/714; 400/496; 312/208; 312/292; 312/271; 312/140; 235/145 R; 200/302.1; 200/303; 200/304; 200/333; 434/227; 434/229
[58] Field of Search ............... 400/491, 496, 714, 713, 400/472; 434/227, 229; 235/145 R; 312/208, 284, 292, 271, 140; 200/302.1, 303, 304, 333

[56] References Cited

U.S. PATENT DOCUMENTS

| | | | |
|---|---|---|---|
| 1,203,570 | 11/1916 | Beaubien | 400/491 |
| 4,060,163 | 11/1977 | Willingham | 400/714 |
| 4,119,839 | 10/1978 | Beckmann et al. | 235/145 R |
| 4,294,557 | 10/1981 | Blanchard | 400/714 |
| 4,449,763 | 5/1984 | Barnett | 312/208 |
| 4,671,688 | 6/1987 | Brashears | 400/714 |
| 4,893,954 | 1/1990 | Kotur | 400/714 |

Primary Examiner—Eugene H. Eickholt
Attorney, Agent, or Firm—Leon Gilden

[57] ABSTRACT

A cover apparatus including a transparent housing overlying a computer keyboard, wherein the cover apparatus includes a plurality of forward and rear side walls defining rows of openings, wherein each row of openings is arranged overlying rows of computer keys. The openings are provided with cover housings to selectively cover individual or the plurality of keys, wherein each of the plurality of keys of the computer keyboard is positioned within the openings to provide selective covering thereof to minimize inadvertent pressing of such keys in usage of the keyboard.

4 Claims, 4 Drawing Sheets

COMPUTER KEY COVER APPARATUS

BACKGROUND OF THE INVENTION

1. Field of the Invention

The field of invention relates to computer apparatus, and more particularly pertains to a new and improved computer key cover apparatus wherein the same utilizes members to selectively cover individual key members of a keyboard to prevent inadvertent depressing of such keys.

2. Description of the Prior Art

Various computer apparatus is utilized in the prior art to provide various training techniques in the use of computer devices. Examples of such devices may be found in U.S. Pat. No. 4,060,163 to Willingham wherein the keyboard guard set forth therewithin utilizes a planar rigid member formed with predetermined openings therethrough to prevent inadvertent depressing of particular keys covered by the board member.

U.S. Pat. No. 4,893,954 to Kotur sets forth a keyboard cover for use with office machines, wherein the keyboard cover utilizes a planar member utilizing recesses formed within the cover aligned with underlying keys to provide selective covering of the keys.

U.S. Pat. No. 4,294,557 to Blanchard, et al. sets forth a shield for a typewriter keyboard to provide a shield to block a student typist view of the keyboard.

As such, it may be appreciated that there continues to be a need for a new and improved computer key cover apparatus as set forth by the instant invention which addresses both the prob)ems of ease of use as well as effectiveness in construction and in this respect, the present invention substantially fulfills this need.

SUMMARY OF THE INVENTION

In view of the foregoing disadvantages inherent in the known types of computer apparatus now present in the prior art, the present invention provides a computer key cover apparatus wherein the same utilizes individual covers to selectively cover individual keys of an underlying computer keyboard. As such, the general purpose of the present invention, which will be described subsequently in greater detail, is to provide a new and improved computer key cover apparatus which has all the advantages of the prior art computer apparatus and none of the disadvantages.

To attain this, the present invention provides a cover apparatus including a transparent housing overlying a computer keyboard, wherein the cover apparatus includes a plurality of forward and rear side walls defining rows of openings, wherein each row of openings is arranged overlying rows of computer keys. The openings are provided with cover housings to selectively cover individual of the plurality of keys, wherein each of the plurality of keys of the computer keyboard is positioned within the openings to provide selective covering thereof to minimize inadvertent pressing of such keys in usage of the keyboard.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer key cover apparatus which has all the advantages of the prior art computer apparatus and none of the disadvantages.

It is another object of the present invention to provide a new and improved computer key cover apparatus which may be easily and efficiently manufactured and marketed.

It is a further object of the present invention to provide a new and improved computer key cover apparatus which is of a durable and reliable construction.

An even further object of the present invention is to provide a new and improved computer key cover apparatus which is susceptible of a low cost of manufacture with regard to both materials and labor, and which accordingly is then susceptible of low prices of sale to the consuming public, thereby making such computer key cover apparatus economically available to the buying public.

Still yet another object of the present invention is to provide a new and improved computer key cover apparatus which provides in the apparatuses and methods of the prior art some of the advantages thereof, while simultaneously overcoming some of the disadvantages normally associated therewith.

Still another object of the present invention is to provide a new and improved computer key cover apparatus wherein the same permits selective covering of individual keys of a computer keyboard to prevent inadvertent depressing of such keys.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
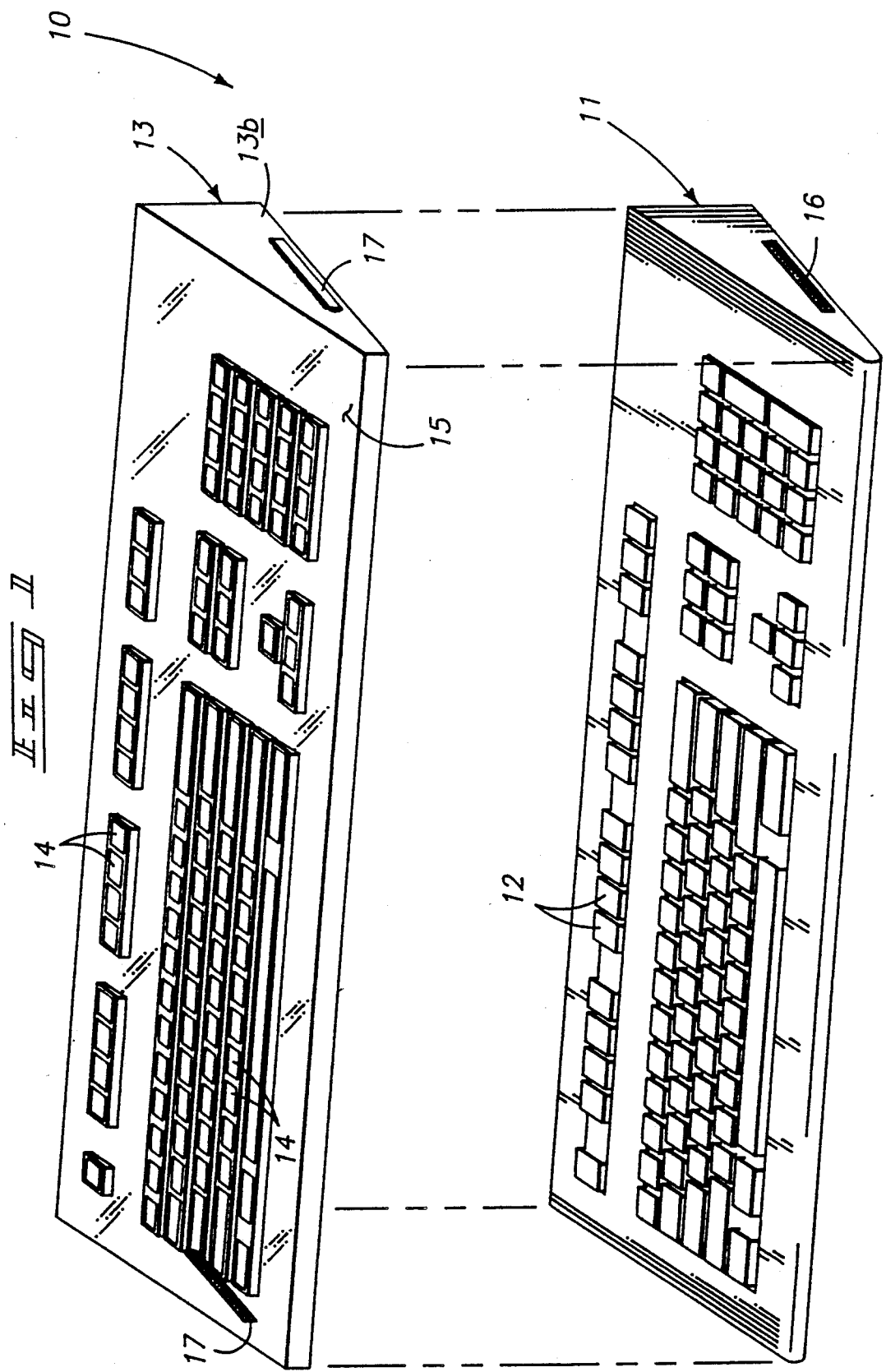
FIG. 1 is an isometric illustration of the instant invention.
Figure 2:
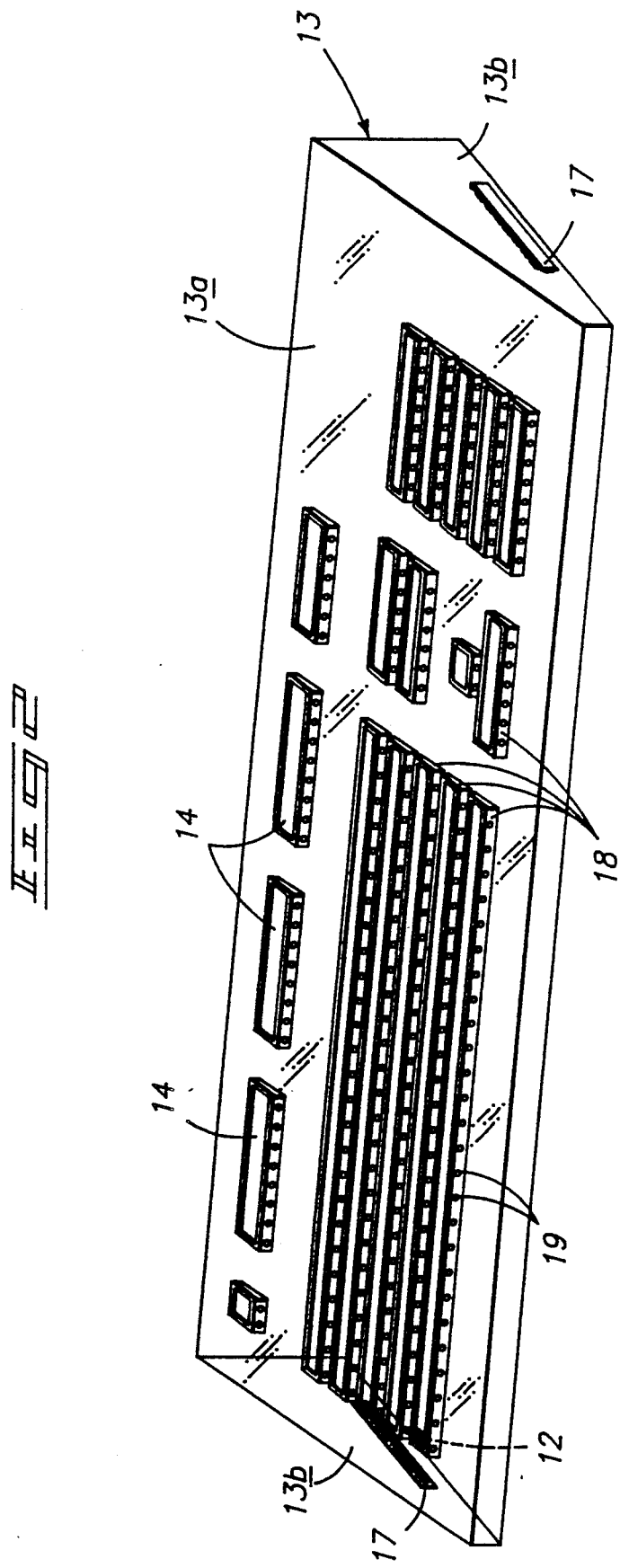
FIG. 2 is an isometric illustration of the cover organization, somewhat enlarged for illustration and details associated therewith.
Figure 3:
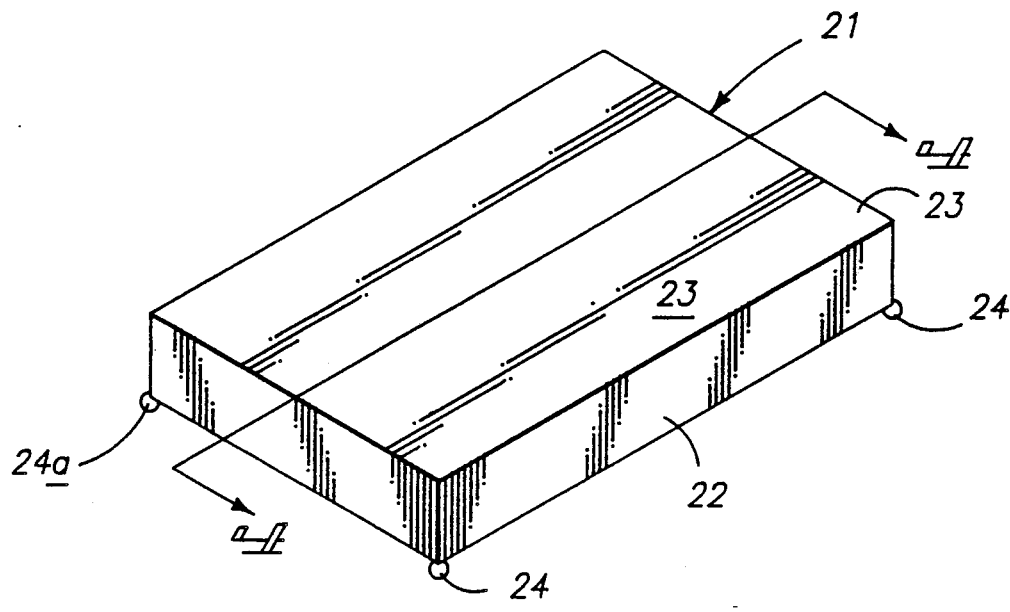
FIG. 3 is an isometric illustration of a cover housing utilized by the instant invention.
Figure 4:
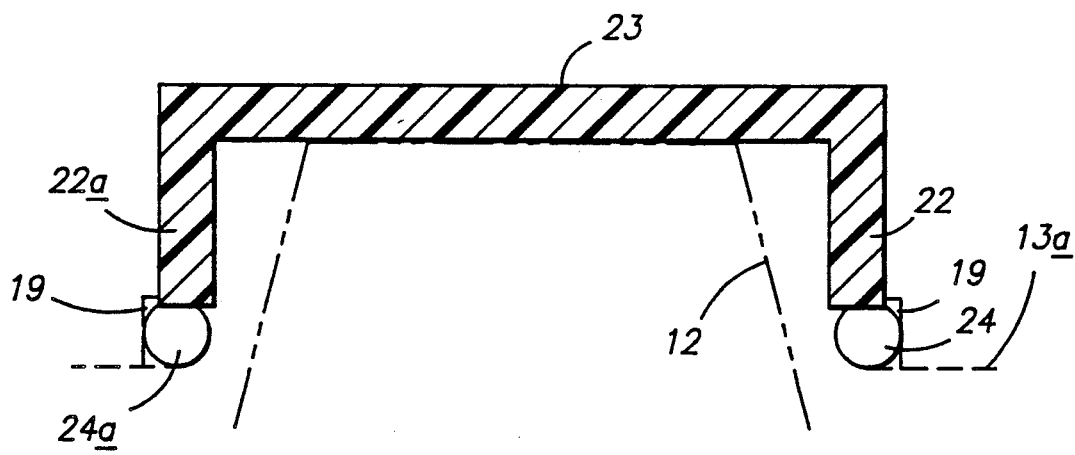
FIG. 4 is an orthographic side view, taken along the lines 4—4 of FIG. 3, in the direction indicated by the arrows.
Figure 5:
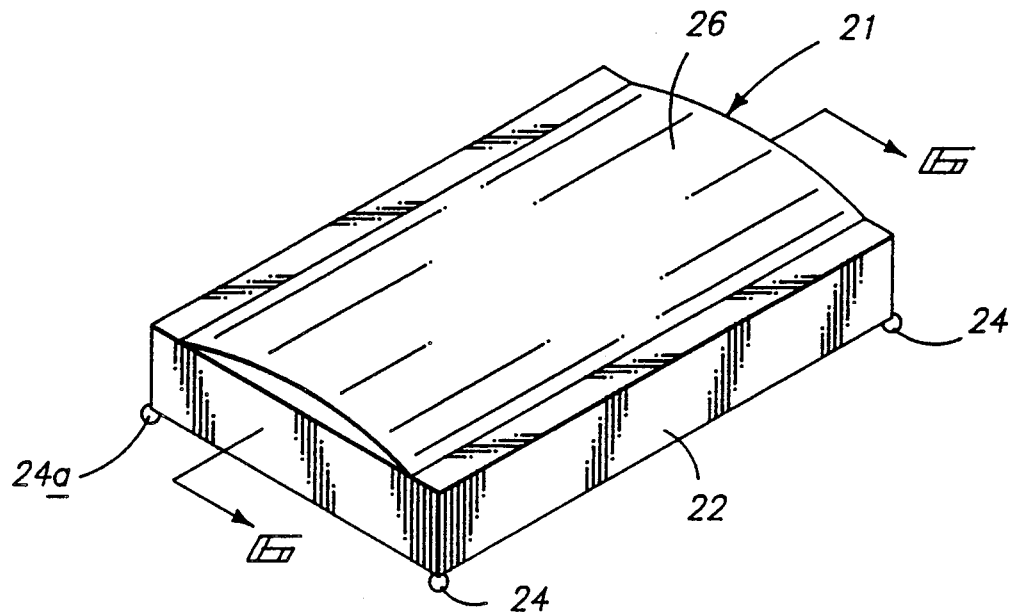
FIG. 5 is an isometric illustration of a modified cover housing utilized by the instant invention.
Figure 6:
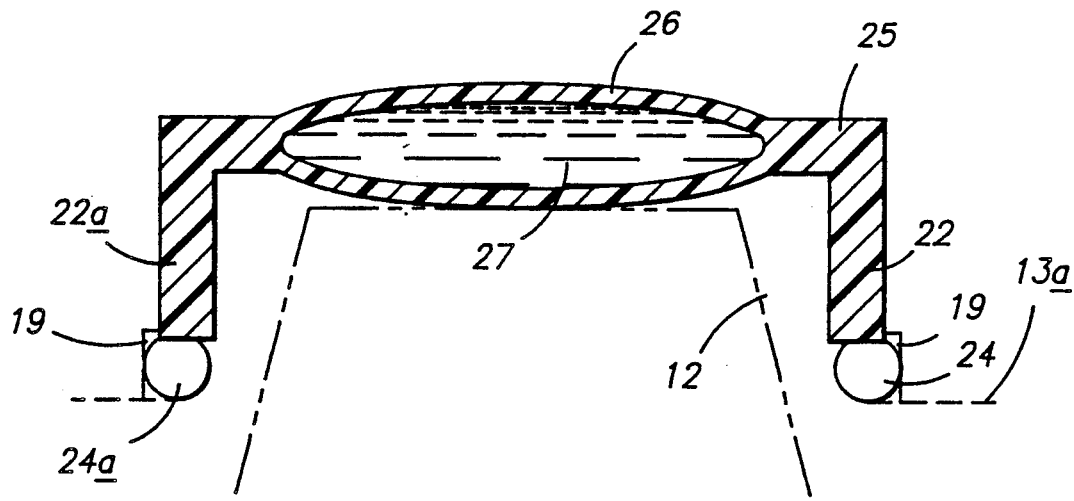
FIG. 6 is an orthographic view, taken along the lines 6—6 of FIG. 5 in the direction indicated by the arrows.

With reference now to the drawings, and in particular to FIGS. 1 to 6 thereof, a new and improved computer key cover apparatus embodying the principles and concepts of the present invention and generally designated by the reference numeral 10 will be described.

More specifically, the computer key cover apparatus 10 of the instant invention essentially comprises the computer keyboard 11 defined by a predetermined geometric configuration, and a plurality of rows of key members 12. The key members 12 are arranged in parallel rows connected to a top wall of the keyboard. Further included is a transparent unitary cover housing 13, wherein the cover housing 13 defines a cavity 15 of an equal predetermined geometric configuration to complementarily receive the computer keyboard 11 therewithin. The housing 13 includes a top wall, including rows of key member openings 14 directed therethrough, wherein the openings 14 are defined by spaced parallel opening side walls 18. The opening side walls 18 each include rows of equally spaced side wall apertures 19 directed orthogonally through the opening side walls, with a plural pair of apertures 19 associated with each key member 12 of the keyboard 11. It should be further noted that the keyboard 11 includes hook and loop fastener first strips 16 mounted to side walls of the keyboard 11, wherein the cover housing 13 includes hook and loop fastener second strips 17 cooperative with the first strips to secure the housing to the keyboard.

A plurality of key member cover housings 21 are provided, wherein each key member cover housing 21 includes a forward side wall 22 spaced from and parallel a rear side wall 22a. The forward and rear side walls 22 and 22a are spaced apart a predetermined spacing substantially equal to a spacing defined between spaced parallel side walls 18. The key member cover housing 21 includes a rigid top wall 23, wherein the rear and forward side walls include respective rear and forward spherical projections 24a and 24 respectively, wherein the spherical projections are formed at intersections of the adjacent side walls of the key member cover housing at each corner thereof at a lower terminal edge of a skirt defined by the side walls of the key member cover housing The forward projections 24 project forwardly of the forward side wall 22, while the rear projections 24a project rearwardly of the rear side wall 22a to accommodate reception of the forward projections 24 within apertures 19 of a lowermost side wall 18, while the rear projections 24 are received within side wall openings 19 of an adjacent rear parallel side wall 18 about a particular row of key members. Each key member cover housing 21 thereby covers a selective key member opening portion of the housing cover 13 to prevent inadvertent access to that key member 12.

A modified key member cover housing 21a includes a modified top wall 25 that includes a bladder 26. The bladder 26 is filled with a compressible fluid 27. In this manner, an individual to depress a key member 12 with a modified key member cover housing 21a overlying that key must present delivery pressure to the bladder 26 to effect that depressing. Inadvertent contact with the bladder 26 would not compress the fluid 27 within the bladder 26 sufficiently to effect depressing of an associated key member 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer key cover apparatus comprising, in combination, a computer keyboard, the computer keyboard defined by a predetermined geometric configuration, with a keyboard top wall with a plurality of key members projecting reciprocatably therethrough, the key members are arranged in parallel rows, and further including a transparent unitary cover housing, the transparent unitary cover housing defines a cavity, wherein the cavity defines a configuration equal to the predetermined geometric configuration to complementarily receive the computer keyboard therewithin, and the keyboard includes a plurality of first hook and loop fastener strips mounted to opposed side walls of the keyboard, and the cover housing includes spaced parallel cover housing side walls, wherein each cover housing side wall includes a hook and loop fastener second strip securable to a respective hook and loop fastener first strip to fixedly secure the cover housing to the keyboard, and the cover housing includes parallel rows of key member openings in surrounding relationship relative to the key members, and the key member openings are defined by parallel side walls, and each of the side walls includes equally spaced side wall apertures directed therethrough, and each key member includes a plurality of pairs of apertures associated with each key member defined by a plurality of forward apertures positioned forwardly of the key members, and a plurality of rear apertures positioned rearwardly of the key members, and a key member cover housing, wherein the key member cover housing is securable to the forward apertures and the rear apertures to selectively secure the key member cover housing overlying selective portions of the key member openings, and wherein the key member cover housing includes a forward side all and a rear side wall, the forward side wall and rear side wall are spaced apart a predetermined spacing, and the side walls of the openings are spaced apart an equal predetermined spacing, and the cover housing forward side wall includes a plurality of spherical forward projections, and the cover housing rear side wall includes a plurality of rear spherical projections, wherein the spherical forward projections extend forwardly and beyond the cover housing forward side wall, and the spherical rear projections extend rearwardly of the rear side wall, wherein the forward and rear projections are respectively receivable within a forward side wall and a rear side wall about a respective key member.

2. An apparatus as set forth in claim 1 wherein the key member cover housing includes a forward side wall and a rear side wall, the forward side wall and rear side wall are spaced apart a predetermined spacing, and the side walls of the openings are spaced apart an equal predetermined spacing, and the cover housing forward side wall includes a plurality of spherical forward projections, and the cover housing rear side wall includes a plurality of rear spherical projections, wherein the spherical forward projections extend forwardly and beyond the cover housing forward side wall, and the spherical rear projections extend rearwardly of the rear side wall, wherein the forward and rear projections are respectively receivable within a forward side wall and a rear side wall about a respective key member.

3. An apparatus as set forth in claim 1 wherein the cover housing includes a top wall.

4. An apparatus as set forth in claim 3 wherein the top wall includes a flexible bladder, the flexible bladder includes a compressible fluid filling the bladder.

* * * * *